(12) United States Patent
De Laforcade

(10) Patent No.: US 6,609,457 B1
(45) Date of Patent: Aug. 26, 2003

(54) STENCIL FOR APPLYING A COSMETIC PRODUCT AND METHOD OF MANUFACTURE

(75) Inventor: Vincent De Laforcade, Rambouillet (FR)

(73) Assignee: L'Oreal S.A., Paris (FR)

( * ) Notice: Subject to any disclaimer, the term of this patent is extended or adjusted under 35 U.S.C. 154(b) by 0 days.

(21) Appl. No.: 09/541,681

(22) Filed: Mar. 31, 2000

(30) Foreign Application Priority Data

Mar. 31, 1999 (FR) .............................. 99 04044

(51) Int. Cl.⁷ .............................................. B05C 17/06
(52) U.S. Cl. .............................. 101/127.1; 101/128.4; 101/129
(58) Field of Search ................................ 101/114, 127, 101/127.1, 129, 126, 128.4; 160/352; 38/102.1, 102.2, 102.9

(56) References Cited

U.S. PATENT DOCUMENTS

| 430,457 A | * | 6/1890 | Yule ......................... 101/127.1 |
| 1,134,571 A | * | 4/1915 | West ......................... 101/127.1 |
| 1,618,216 A | | 2/1927 | Niederer |
| 1,822,986 A | * | 9/1931 | Bauer ......................... 101/127.1 |
| 2,347,022 A | * | 4/1944 | Austin ......................... 101/129 |
| 2,670,745 A | * | 3/1954 | Lui ............................ 132/88.5 |
| 3,973,689 A | | 8/1976 | Sutch |
| 5,743,182 A | * | 4/1998 | Kobayashi et al. ......... 101/129 |
| 6,004,223 A | * | 12/1999 | Newcomb ................... 101/127 |

FOREIGN PATENT DOCUMENTS

| CH | 129 360 | | 12/1928 |
| CH | 619647 | * | 10/1980 |
| DE | 36 15 741 | | 11/1987 |
| FR | 741 394 | | 2/1933 |
| FR | 783 924 | | 7/1935 |
| FR | 2 234 107 | | 1/1975 |
| GB | 1 463 314 | | 2/1977 |
| GB | 2222554 | * | 3/1990 |
| JP | 50-36283 | | 4/1975 |

OTHER PUBLICATIONS

English language Derwent Abstract of DE 36 15 741.

* cited by examiner

Primary Examiner—Ren Yan
(74) Attorney, Agent, or Firm—Finnegan, Henderson, Farabow, Garrett & Dunner, LLP

(57) ABSTRACT

The present invention relates to a stencil for applying make-up to an area of the body, such as the hair or skin. The stencil includes a flexible sheet bearing a pattern that is to be reproduced on a convex surface, and of which one region, located near a peripheral edge, is attached to a rigid frame in the form of an annular element, the flexible sheet being mounted on the rigid frame in such a way as to form a dome inside the frame.

37 Claims, 3 Drawing Sheets

STENCIL FOR APPLYING A COSMETIC PRODUCT AND METHOD OF MANUFACTURE

The present invention relates to a stencil of the type including a support forming a design or pattern that is to be transferred onto a surface to be printed, with a non-planar profile and, in particular, a convex profile. The stencil according to the invention is most particularly suited to producing designs or patterns printed on hair or other certain parts of the body.

Stencils have been widely used for producing designs or patterns printed on flat surfaces. Typically, a stencil of this kind is made of a relatively rigid support from which is cut the pattern that is to be produced. The support is applied to the element that is to be decorated, and a colorant is applied so as to deposit the colorant onto the surface that is to be printed and do so in the pattern defined by the design made in the support. The colorant may be applied using a brush or an applicator, particularly of the cellular foam type, pierced at its center with a duct communicating with a container on which the foam is mounted. This technique is used particularly for interior decorating or in the field of cosmetics for applying body make-up. It works entirely satisfactorily when the surface to be decorated is flat or approximately flat.

Problems arise when this technique is to be used for decorating non-planar surfaces, such as the hair, or certain convex surfaces of the body. This is because the center of the pattern can easily be applied at the desired point using a rigid stencil of the type described hereinabove but, because of the curvature of the head or other body areas, the edges of the pattern are not clearly defined.

Making the stencil from a support made of flexible material does not satisfactorily solve the problem in so far as its use requires the stencil to be held in place on the scalp at the same time as application of the product. Experience has shown that, particularly on account of the difficulty of holding the flexible support in position on the head, it is difficult to apply the product to the hair without calling on a third party for assistance.

Thus, one of the objects of the invention is to produce a stencil suited for decorating or applying make-up to non-planar surfaces, and this stencil at least partially solves the aforementioned problems.

In particular, one object of the invention is to produce a stencil, suited in particular to applying make-up to the hair or applying body make-up, that someone can use without requiring the help of a third party.

Another object of the invention is to produce a stencil which is simple to use and economical to produce.

It should be understood that the invention could still be practiced without performing one or more of the preferred objects and/or advantages set forth above. Still other objects will become apparent after reading the following description of the invention.

To achieve these and other advantages, and in accordance with the purposes of the invention, as embodied and broadly described herein, the invention includes a stencil. The stencil comprises a substantially flexible sheet bearing a pattern that is to be reproduced on a convex surface. One region of the sheet, located near a peripheral edge, is attached to a substantially rigid frame, the flexible sheet being mounted on the frame in such a way as to form a dome inside the frame. Preferably, the frame has a substantially annular shape, but the invention in its broadest aspects could be practiced with many differently shaped frames.

Preferably, the substantially rigid frame allows the stencil to be positioned at the desired point, particularly on the head, and held in place there with ease. The flexible sheet bearing the design that is to be reproduced can be permanently shaped to the curvature of the surface that is to be decorated. The action is simple, and application may be performed without having to involve a third party. By way of indication, the stencil may have a diameter that may be of the order of 10 cm to 15 cm. The rigidity of the frame is at least such that this frame remains in shape in the absence of appreciable stress and, in particular, does not deform under its own weight. The radius of curvature formed by the dome of the flexible sheet is of the same order as the radius of curvature of the surface that is to be decorated, so that the entire design can rest against the surface that is to be treated.

The flexible sheet is preferably not elastically deformable (in the case of a multi-layer sheet, at least one of the layers is made of a material which is not elastically deformable) so that the pattern, produced by removing material, does not deform during application.

As a preference, the peripheral region by which the flexible sheet is attached to the frame has an inner edge and an outer edge, the inner edge having a radius R smaller than the radius $R+\epsilon$ which that portion of the flexible sheet that extends inside the inner edge would form if the flexible sheet were not secured to the frame.

Advantageously, $1.01 * R \leq R+\epsilon \leq 1.05 * R$. More preferably, $1.01 * R \leq R+\epsilon \leq 1.02 * R$.

Such differences in radii are particularly advantageous in that they can be achieved entirely naturally by a phenomenon known as "post-shrinkage" which is observed when molding materials such as thermoplastics. In general, "post-shrinkage" in the sphere of molding is seen as a constraint that has to be accounted for in the molding process when determining the operating parameters thereof.

Advantageously, the frame is formed of at least two parts which can be folded one onto the other. Thus, a structure is produced that makes it possible to obtain a relatively large-sized pattern for printing (particularly from 10 to 15 cm), but which can be folded so as to occupy less space in the storage position. For this purpose, the parts of the annular frame may be connected together by an articulation, particularly of the film hinge type.

According to a preferred embodiment of the invention, the rigid frame is obtained by molding a first thermoplastic in a mold, in one plane of which is held the flexible sheet, already formed and cut to the desired size and shape, the sheet having at least one layer of a second thermoplastic which is physico-chemically compatible with the first thermoplastic, so as to allow the frame to attach to the flexible sheet along the peripheral attachment region. Physico-chemically compatible materials are materials which, in the molten or softened state, are able to weld together.

This characteristic of the stencil according to the invention is quite particularly advantageous in that it makes it possible to obtain a uniform dome, making it possible to obtain a printing pattern with a very sharp outline. Specifically, the advantageous effect of such a characteristic stems from the "post-shrinkage" phenomenon described previously, which is observed in the molding processes, particularly the molding of thermoplastics.

In practice, there are several advantageous aspects associated with producing the stencil by molding, using a technique similar to the so-called In-Mold Labeling (IML) technique, known in the field of labeling certain objects which are made of thermoplastic, particularly bottles.

On the one hand, it allows the peripheral edge of the sheet to be attached to the rigid frame in a perfectly uniform way with no creases or other irregularities. This is because attachment (which occurs by localized "fusion" of mutually compatible materials) of the peripheral edge of the flexible sheet to the annular frame occurs almost instantaneously when the first molten thermoplastic is injected under pressure, this fusing being with a sheet held flat in the mold. As a preference, the attachment region extends continuously over 360°.

On the other hand, because of the "post-shrinkage" of the material of which the frame is made, the sheet, the peripheral edge of which was secured to the rigid frame beforehand, is forced, under the effect of centripetal forces applied uniformly over 360°, to deform into the shape of a homogeneous dome, able in particular to approximately follow the curvature of the head. These centripetal forces, exerted uniformly over 360°, effectively result in a slight reduction in the diameter of the frame, which reduction causes the sheet to permanently adopt the dome shape. In practice, the peripheral edge of the flexible sheet attaches to the frame in the mold almost instantaneously, especially in a cooled mold, whereas the "post-shrinkage" phenomenon takes place over a time which may be as long as 48 hours, and, therefore, well after the sheet has been irremovably attached to the frame. This "post-shrinkage" phenomenon obviously occurs in all directions in space, but is most noticeable over the largest diameter of the molded object, namely the circumference. In the case of an annular frame with a diameter of 100 mm to 150 mm, the reduction in diameter may, depending on the material used and the molding conditions, be of the order of 1 mm to 7.5 mm.

Advantageously, the first thermoplastic is a polyolefin chosen, for example, from polyethylenes, polypropylenes, polyacetates and polycarbonates.

Advantageously also, the flexible sheet includes at least two layers including a first layer made with the second thermoplastic, and a second layer capable of forming a decorative layer and made of a material such as paper or polyethylene terephthalate. The "post-shrinkage" phenomenon does not occur on the flexible sheet provided it is kept at a temperature below the softening or melting temperature of the thermoplastic of which it is made, except in the highly localized region of its periphery where it is "welded" to the frame. Thus, no appreciable reduction in the diameter of the sheet occurs, so the sheet has no other choice but to shape itself into the desired dome shape.

The stencil according to the invention is advantageously used for applying a cosmetic product to apart of the body. For example, the stencil could be used to apply hair coloring to hair.

In another aspect of the invention, there is provided a method for manufacturing a stencil comprising a substantially flexible sheet bearing a pattern that is to be reproduced on a convex surface, and of which one region, located near a peripheral edge, is attached to a substantially rigid frame in the form of an annular element, for example, the method comprising producing the frame, by molding a first thermoplastic in a mold, in one plane of which is held the flexible sheet, already formed and cut to the desired size and shape, the sheet having at least one layer of a second thermoplastic which is physico-chemically compatible with the first thermoplastic, so as to allow the frame to attach to the flexible sheet along the peripheral attachment region, a reduction in the diameter of the frame thus attached to the flexible sheet, under the effect of the "post-shrinkage" of the first thermoplastic, causing the flexible sheet to form a dome inside the frame. The first and second thermoplastics may be identical or different, the only condition being that they be mutually compatible.

More specifically, the method may include placing the flexible sheet, already formed and cut to the desired size and shape, in a mold, the mold being kept at a temperature below the softening temperature of the second thermoplastic, injecting the first thermoplastic under pressure into an annular region of the mold so as to form the frame, the annular region being arranged in such a way that, as the frame is molded, the flexible sheet becomes welded to the frame along the peripheral attachment region, and demolding the stencil.

The mold is preferably of the type with two separable parts. The flexible sheet may be held in position in the mold parts by suction. The mold may be kept at a temperature close to about 45° C., it being possible for the first thermoplastic to be injected into the annular region of the mold at a temperature of from about 180° C. to about 240° C.

According to one aspect of the invention, a stencil is provided. The stencil comprises a substantially rigid frame, and a substantially flexible sheet having at least one aperture passing through the sheet and defining a pattern, a peripheral region of the sheet being attached to the frame, the flexible sheet forming a dome within the frame configured to allow the pattern of the at least one aperture to be reproduced on a substantially convex surface.

According to another aspect of the invention, a method of applying make-up to the hair or body is provided. The method comprises placing a stencil comprising a substantially rigid frame, and a substantially flexible sheet having at least one aperture passing through the sheet and defining a pattern, a peripheral region of the sheet being attached to the frame, the flexible sheet forming a dome within the frame configured to allow the pattern of the at least one aperture to be reproduced on a substantially convex surface on an area of the body, and applying a cosmetic product to the area of the body by passing the cosmetic product through the at least one aperture in the sheet.

According to a further aspect of the invention, a method of manufacturing a stencil having a substantially rigid frame and a substantially flexible sheet having at least one aperture passing through the sheet and defining a pattern, a peripheral region of the sheet being attached to the frame is provided. The method comprises providing a flexible sheet in a mold, passing a first thermoplastic into the mold to mold a substantially rigid frame, permitting the first thermoplastic of the frame to become attached to a peripheral region of the sheet including a second thermoplastic which is physico-chemically compatible with the first thermoplastic, and reducing at least one dimension of the frame to form the flexible sheet into a dome shape within the frame.

According to yet another aspect of the invention, a stencil for applying make-up to the hair and body is provided. The stencil comprises a substantially annular frame, and a flexible concave surface within the frame, the concave surface having a pattern thereon.

Beside the structural arrangements set forth above, the invention could include a number of other arrangements, such as those explained hereinafter. It is to be understood that both the foregoing description and the following description are exemplary, and are intended to provide further explanation of the invention as claimed.

The accompanying drawings are included to provide a further understanding of the invention and are incorporated in and constitute a part of this specification. The drawings illustrate embodiments of the invention and, together with the description, serve to explain the principles of the invention. In the drawings, FIG. 1A is an isometric view of a stencil according to a first embodiment of the invention;

Reference will now be made in detail to the present preferred embodiments of the invention, examples of which are illustrated in the accompanying drawings. Wherever possible, the same reference numbers are used in the drawings and the description to refer to the same or like parts.

Figure 1A:
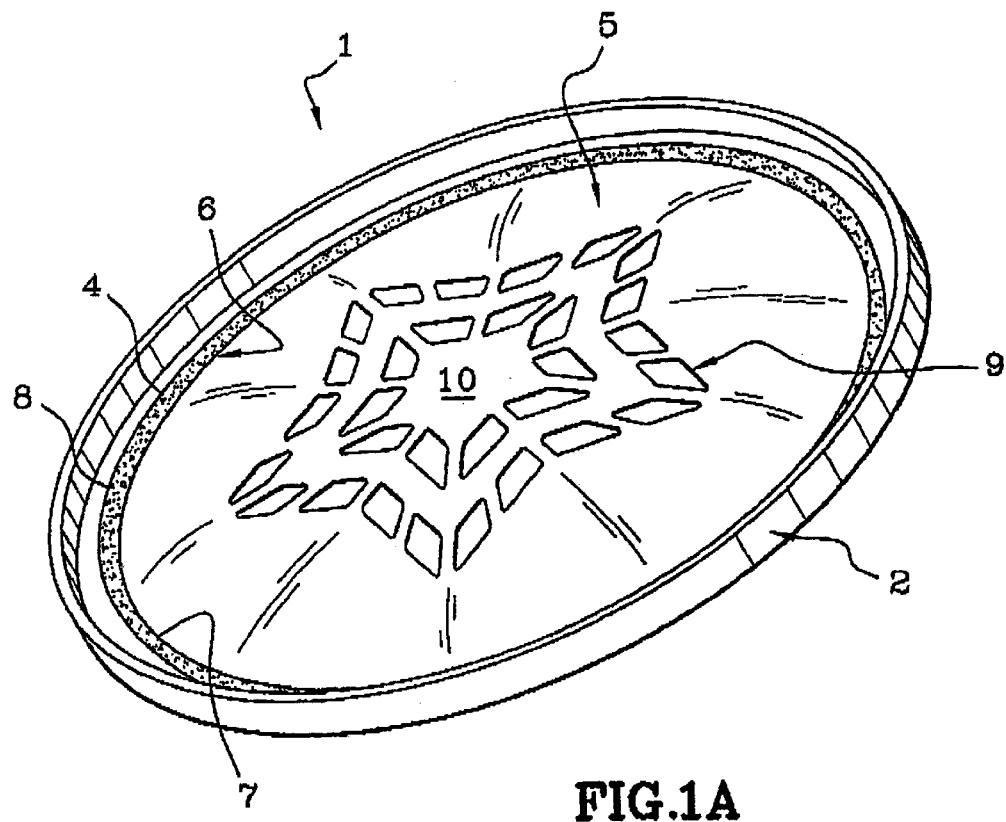
FIG. 1B is a side view of the stencil of FIG. 1A.
Figure 1B:
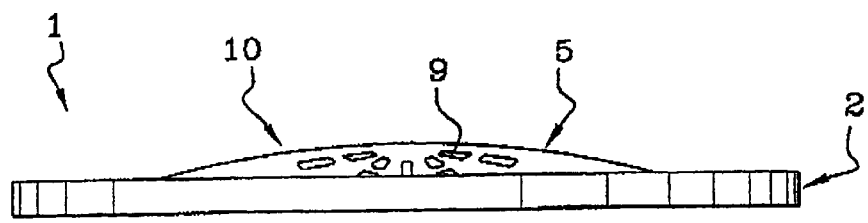
Figure 3:
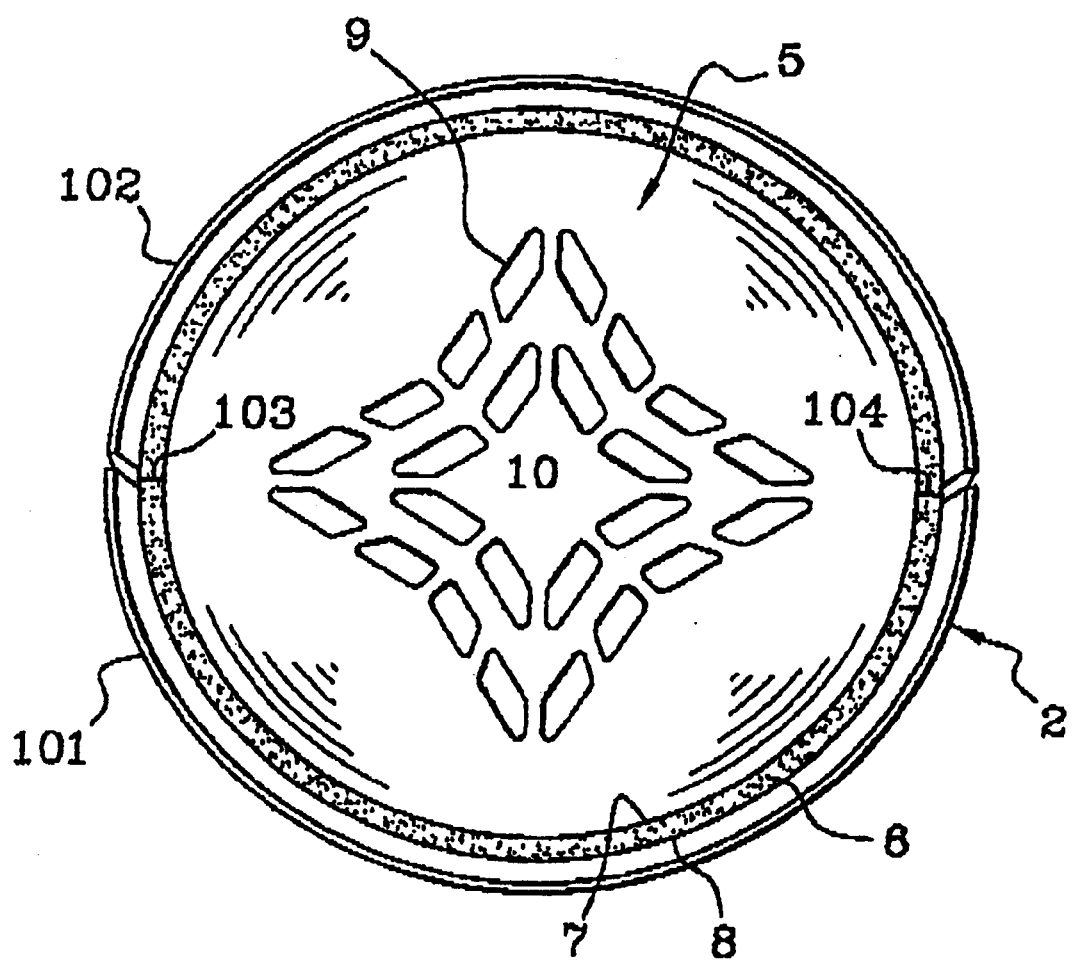
FIG. 3 is a top view of an alternative embodiment of a stencil according to the present invention.

As embodied herein and shown in FIGS. 1A, 1B and 3, a stencil is provided.

As depicted in FIGS. 1A and 1B (and 2A–2C, which illustrate a method of manufacture), the stencil 1 comprises an annular frame 2 of circular exterior outline, an annular surface portion 3 of annular frame 2 is welded to the peripheral edge 4 of a flexible sheet 5 made of a material that is not elastically deformable, via an annular weld region 6, the flexible sheet being placed inside the frame 2. The surface portion 3 on which the weld region 6 is formed is arranged approximately in the plane in which the flexible sheet 5 extends during molding, and is extended by a portion, the cross section of which forms a V, a free end of which lies approximately in the plane of the surface portion 3.

At its center, the flexible sheet 5 has at least one aperture (i.e., cutout) defining a design 9, intended to form a corresponding colored pattern on a surface that is to be decorated, in this instance the hair. The weld region 6 is delimited by an inner edge 7 and an outer edge 8. The inner edge 7 has a radius R smaller than the radius which that portion of the flexible sheet that extends inside the inner edge would form if the flexible sheet were not secured to the frame 2, so that, as is clearly visible in FIGS. 1B and 2C, the flexible sheet 5 forms a dome 10 inside the frame 2. By way of indication, the inner edge 7 of the weld region 6 has a radius R which is of the order of 57 mm, while that portion of the flexible sheet which extends inside the inner edge 7 has a radius which is of the order of 59 mm, this difference in radius proving to be just enough for the flexible sheet 5 bearing the pattern 9 to form a dome having a concave surface capable of shaping itself to the convex profile of the user's head. This difference in radius roughly corresponds to $\epsilon$ to which reference will be made hereinafter.

According to a specific embodiment, the frame 2 is made of polypropylene. The flexible sheet 5 is made of a paper and polypropylene complex, the layer of polypropylene being positioned facing the surface portion 3 of the frame 2.

Figure 2A:
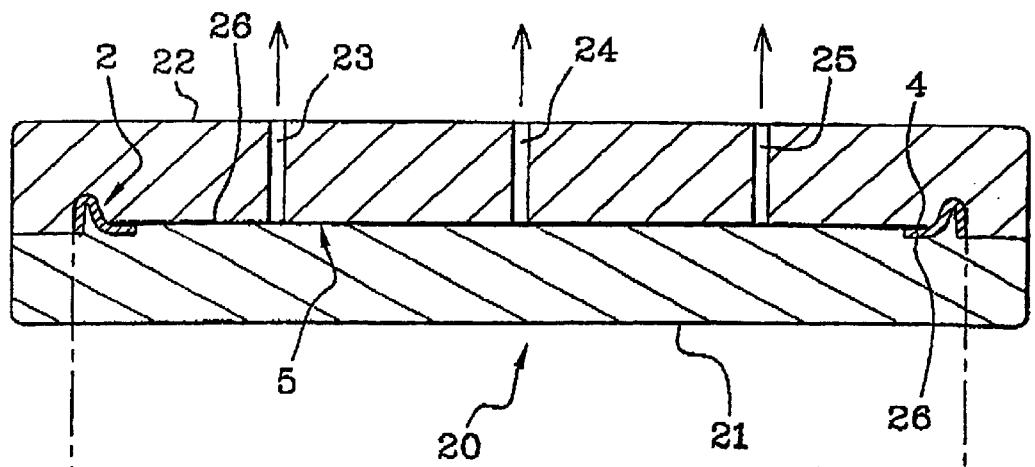
FIGS. 2A–2C are cross-sectional side views of the stencil depicted in FIGS. 1A–1B in various stages of manufacture according to the present invention.
Figure 2B:
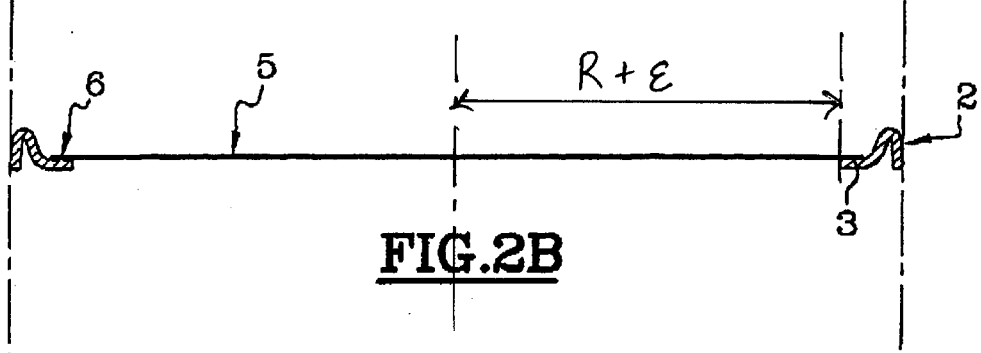
Figure 2C:
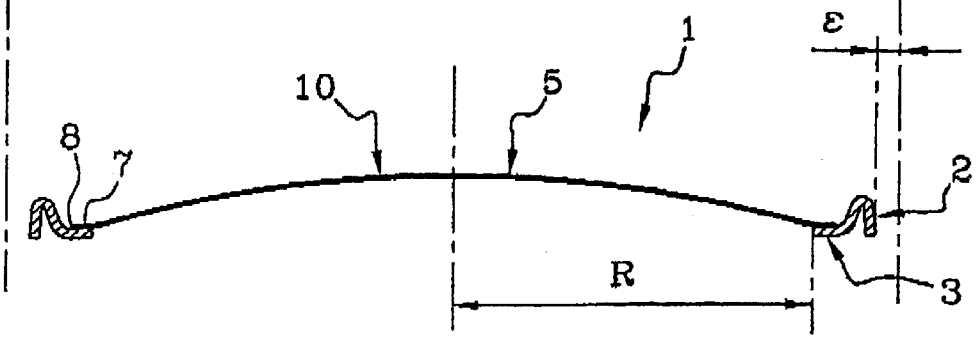

FIGS. 2A–2C illustrate one embodiment of a stencil 1 according to the invention. As is clearly apparent from FIG. 2A, use is made of a mold 20 having two parts 21, 22 which can be moved apart. One part, 22, of the mold 20 has ducts 23–25 connected to a vacuum source (not depicted) and opening onto a planar face 26 located in a parting line of the mold 20. When the mold is open, the flexible sheet 5 is positioned against the face 26 of the part 22 of the mold, where it is held in place by suction. By closing the mold in the way depicted in FIG. 2A, the two parts 21, 22 of the mold 20 define, right around the sheet 5, an annular space 26 capable of taking the molten material intended to form the rigid or semi-rigid frame 2 of the stencil. The space 26 has a region in which it overlaps the peripheral edge 4 of the sheet 5, so as to define the region 6 where the flexible sheet 5 and the annular frame 2 are welded together.

Once the flexible sheet 5 has been positioned in the mold 20 in the way mentioned hereinabove, and once the mold 20 has been closed, the material intended to form the frame 2 is injected into the space 26 under pressure and at a temperature of the order of about 200° C. The mold is kept constantly cooled at a temperature of the order of about 45° C. Because of the temperature difference, the molten substance sets almost instantaneously in the space 26, welding itself to the peripheral edge 4 of the flexible sheet 5.

The stencil is then removed from the mold and, on leaving the mold 20, is in the form illustrated in FIG. 2B. In this position, the rigid or semi-rigid frame 2 has an outside diameter roughly equal to the outside diameter of the annular cavity 26 delimited by the two parts 21 and 22 of the mold 20. The flexible sheet 5 is held taut inside the frame 2, to which it is attached continuously and without creases along the annular weld region 6.

After several hours, under the effect of the "post-shrinkage" phenomenon discussed hereinabove, the diameter of the frame 2 decreases by several millimeters, forcing the flexible sheet 5 to form a uniform dome 10 with the pattern 9 that is to be formed on the hair at its center. The reduction in diameter of the frame 2 corresponds to twice the value E shown in FIG. 2C.

In the embodiment of FIG. 3, the frame 2 of the stencil 1 is formed of two discontinuous semi-circular portions 101, 102 separated by film hinges 103, 104 arranged at 180°. The stencil according to this embodiment is obtained using the same method as the one described with FIGS. 2A–2C, but with a mold cavity 20 of a slightly different shape because the mold is made of two articulated parts. The presence of the rigid or semi-rigid frame made in two parts articulated about an axis passing through the two film hinges 103, 104, makes it possible to produce a structure that can be folded in a storage position, and therefore occupy less space.

Although not shown in the drawings, means, of the type including a stub which is able to snap-fasten into a corresponding recess, are provided, to reversibly immobilize the two parts in their 180° position depicted in FIG. 3.

It will be apparent to those skilled in the art that various modifications and variations can be made to the structure and methodology of the present invention without departing from the scope or spirit of the invention. Thus, it should be understood that the invention is not limited to the examples discussed in the specification. Rather, the present invention is intended to cover modifications and variations of this invention, provided they fall within the scope of the following claims and their equivalents.

What is claimed is:

1. A stencil comprising:
    a substantially rigid frame, the frame comprising a thermoplastic; and
    a substantially flexible sheet having at least one aperture passing through the sheet and defining a pattern, a peripheral region of the sheet being attached to the frame, the sheet being sufficiently flexible to form a dome within the frame configured to allow the pattern of the at least one aperture to be reproduced on a substantially convex surface.

2. The stencil of claim 1, wherein the peripheral region of the sheet includes an inner edge and an outer edge, the flexible sheet having a radius R extending from the center of the flexible sheet to the inner edge when attached to the frame and an original radius R+$\epsilon$ extending from the center of the flexible sheet to the inner edge if the sheet was not attached to the frame, the radius R being smaller than the radius R+$\epsilon$.

3. The stencil of claim 2, wherein the relationship between the radius R and the radius R+$\epsilon$ is defined by $1.01*R \leq R+\epsilon \leq 1.05*R$.

4. The stencil of claim 3, wherein the relationship between the radius R and the radius R+ϵ is defined by $1.01*R \leq R+\epsilon \leq 1.02*R$.

5. The stencil of claim 1, wherein the frame includes at least two parts, the at least two parts being configured to fold with respect to one another.

6. The stencil of claim 5, wherein the at least two parts are articulatably connected to one another.

7. The stencil of claim 6, wherein the at least two parts are connected by at least one film hinge.

8. The stencil of claim 1, wherein the peripheral region attached to the frame extends continuously over 360 degrees.

9. The stencil of claim 1, wherein the flexible sheet is not elastically deformable.

10. The stencil of claim 1, wherein the frame is molded of a first thermoplastic, and wherein the sheet includes at least one layer of a second thermoplastic which is physicochemically compatible with the first thermoplastic so as to allow the frame to attach to the flexible sheet along the peripheral region.

11. The stencil of claim 10, wherein the first thermoplastic is a polyolefin chosen from polyethylenes, polypropylenes, polyacetates, and polycarbonates.

12. The stencil of claim 10, wherein the flexible sheet includes at least a first layer of the second thermoplastic and a second layer made of a material chosen from paper and polyethylene terephthalate.

13. The stencil of claim 1, wherein the frame is substantially annular.

14. The stencil of claim 1, wherein the sheet includes a plurality of apertures defining the pattern.

15. A method of applying a cosmetic product to an area of a body, comprising:
  placing a stencil on an area of the body, the stencil comprising
   a substantially rigid frame, and
   a substantially flexible sheet having at least one aperture passing through the sheet and defining a pattern, a peripheral region of the sheet being attached to the frame, the sheet being sufficiently flexible to form a dome within the frame configured to allow the pattern of the at least one aperture to be reproduced on a substantially convex surface; and
  applying a cosmetic product to the area of the body by passing the cosmetic product through the at least one aperture in the sheet.

16. The method of claim 15, wherein the cosmetic product is hair coloring and wherein the area of the body includes hair.

17. A stencil for applying a cosmetic product to an area of a body, comprising:
  a substantially annular frame comprising a thermoplastic having undergone post-shrinkage; and
  a flexible sheet within said frame, said sheet having a pattern and being sufficiently flexible to conform a surface of the sheet to a shape substantially the same as a convex-shaped body area where the cosmetic product is to be applied.

18. The stencil of claim 17, wherein the frame is a substantially rigid frame.

19. The stencil of claim 17, wherein the frame includes first and second portions connected by at least one hinge and configured to permit folding of one portion on top of the other.

20. The stencil of claim 17, wherein the pattern is defined by at least one aperture, a peripheral region of the sheet being attached to the frame, the flexible sheet being sufficiently flexible to form a dome within the frame configured to allow the pattern to be reproduced on the body area.

21. The stencil of claim 20, wherein the peripheral region of the sheet includes an inner edge and an outer edge, the sheet having a radius R extending from its center to the inner edge when attached to the frame and an original radius R+ϵ extending from the center of the flexible sheet to the inner edge if the sheet was not attached to the frame, the radius R being smaller than the radius R+ϵ.

22. The stencil of claim 21, wherein the relationship between the radius R and the radius R+ϵ is defined by $1.01*R \leq R+\epsilon \leq 1.05*R$.

23. The stencil of claim 22, wherein the relationship between the radius R and the radius R+ϵ is defined by $1.01*R \leq R+\epsilon \leq 1.02*R$.

24. The stencil of claim 17, wherein the sheet is continuously attached around its perimeter to the frame.

25. The stencil of claim 17, wherein the sheet is not elastically deformable.

26. The stencil of claim 17, wherein the frame is molded of a first thermoplastic, and wherein the sheet includes at least one layer of a second thermoplastic which is physicochemically compatible with the first thermoplastic so as to allow the frame to attach to the sheet along a peripheral region.

27. The stencil of claim 17, wherein a radius of curvature of the surface is substantially the same as that of the convex shaped body area where the cosmetic product is to be applied.

28. A stencil for applying a cosmetic product to an area of a body, comprising:
  a substantially rigid frame; and
  a substantially flexible sheet having at least one aperture passing through the sheet and defining a pattern, a peripheral region of the sheet being attached to the frame such that the peripheral region of the sheet is pushed in an inward direction with respect to the frame, said sheet being sufficiently flexible to conform a surface of the sheet to a shape substantially the same as a convex-shaped body area where the cosmetic product is to be applied.

29. The stencil of claim 28, wherein the frame is substantially annular.

30. A stencil comprising:
  a substantially rigid frame; and
  a substantially flexible sheet having at least one aperture passing through the sheet and defining a pattern, a peripheral region of the sheet being attached to the frame, the sheet being sufficiently flexible to form a dome within the frame configured to allow the pattern of the at least one aperture to be reproduced on a substantially convex surface,
  wherein the sheet comprises a polymeric material.

31. A stencil comprising:
  a substantially rigid frame; and
  a substantially flexible sheet having at least one aperture passing through the sheet and defining a pattern, a peripheral region of the sheet being attached to the frame, the sheet being sufficiently flexible to form a dome within the frame configured to allow the pattern of the at least one aperture to be reproduced on a substantially convex surface,
  wherein the sheet comprises paper.

32. A stencil comprising:
  a substantially rigid frame; and a substantially flexible sheet, wherein the stencil is formed by reducing at least one dimension of the frame while a peripheral region of the sheet is attached to the frame, such that the sheet is configured to be capable of forming a dome shape.

33. A stencil comprising:

a substantially rigid frame; and a substantially flexible sheet having at least one aperture passing through the sheet and defining a pattern, a peripheral region of the sheet being attached to the frame, the sheet being sufficiently flexible to form a dome within the frame configured to allow the pattern of the at least one aperture to be reproduced on a substantially convex surface, wherein the frame is molded of a first thermoplastic, and wherein the sheet includes at least one layer of a second thermoplastic which is physico-chemically compatible with the first thermoplastic so as to allow the frame to attach to the flexible sheet along the peripheral region.

34. A stencil comprising:

a substantially rigid frame, the frame being substantially annular; and a substantially flexible sheet having at least one aperture passing through the sheet and defining a pattern, the sheet being substantially circular, a peripheral region of the sheet being attached to the frame, the sheet being sufficiently flexible to form a dome within the frame configured to allow the pattern of the at least one aperture to be reproduced on a substantially convex surface, wherein the sheet is attached to the frame along a substantially uniform and continuous weld line.

35. A stencil comprising:

a substantially rigid frame, the frame being substantially annular and defining a first radius; and a substantially flexible sheet having at least one aperture passing through the sheet and defining a pattern, the sheet being substantially circular and defining a second radius, a peripheral region of the sheet being attached to the frame, the sheet being sufficiently flexible to form a dome within the frame configured to allow the pattern of the at least one aperture to be reproduced on a substantially convex surface, wherein the second radius of the sheet is larger than the first radius of the frame, and wherein the sheet is attached to the frame along a substantially uniform and continuous weld line.

36. A system for applying a cosmetic product to an area of a body, the system comprising:

a stencil comprising
   a substantially rigid frame, and
   a substantially flexible sheet having at least one aperture passing through the sheet and defining a pattern, a peripheral region of the sheet being attached to the frame, the sheet being sufficiently flexible to form a dome within the frame configured to allow the pattern of the at least one aperture to be reproduced on a substantially convex surface; and a cosmetic product to be applied using the stencil.

37. A stencil comprising:

a substantially rigid frame, the frame comprising a thermoplastic having undergone post-shrinkage; and a substantially flexible sheet having at least one aperture passing through the sheet and defining a pattern, a peripheral region of the sheet being attached to the frame, the sheet being sufficiently flexible to form a dome within the frame configured to allow the pattern of the at least one aperture to be reproduced on a substantially convex surface.

* * * * *

UNITED STATES PATENT AND TRADEMARK OFFICE
CERTIFICATE OF CORRECTION

PATENT NO. : 6,609,457 B1  Page 1 of 1
DATED : August 26, 2003
INVENTOR(S) : Vincent De Laforcade It is certified that error appears in the above-identified patent and that said Letters Patent is hereby corrected as shown below:

<u>Column 6,</u>
Line 61, "R+c" should read -- R+$\varepsilon$ --.

Signed and Sealed this

Ninth Day of December, 2003

JAMES E. ROGAN
*Director of the United States Patent and Trademark Office*